UNITED STATES PATENT OFFICE.

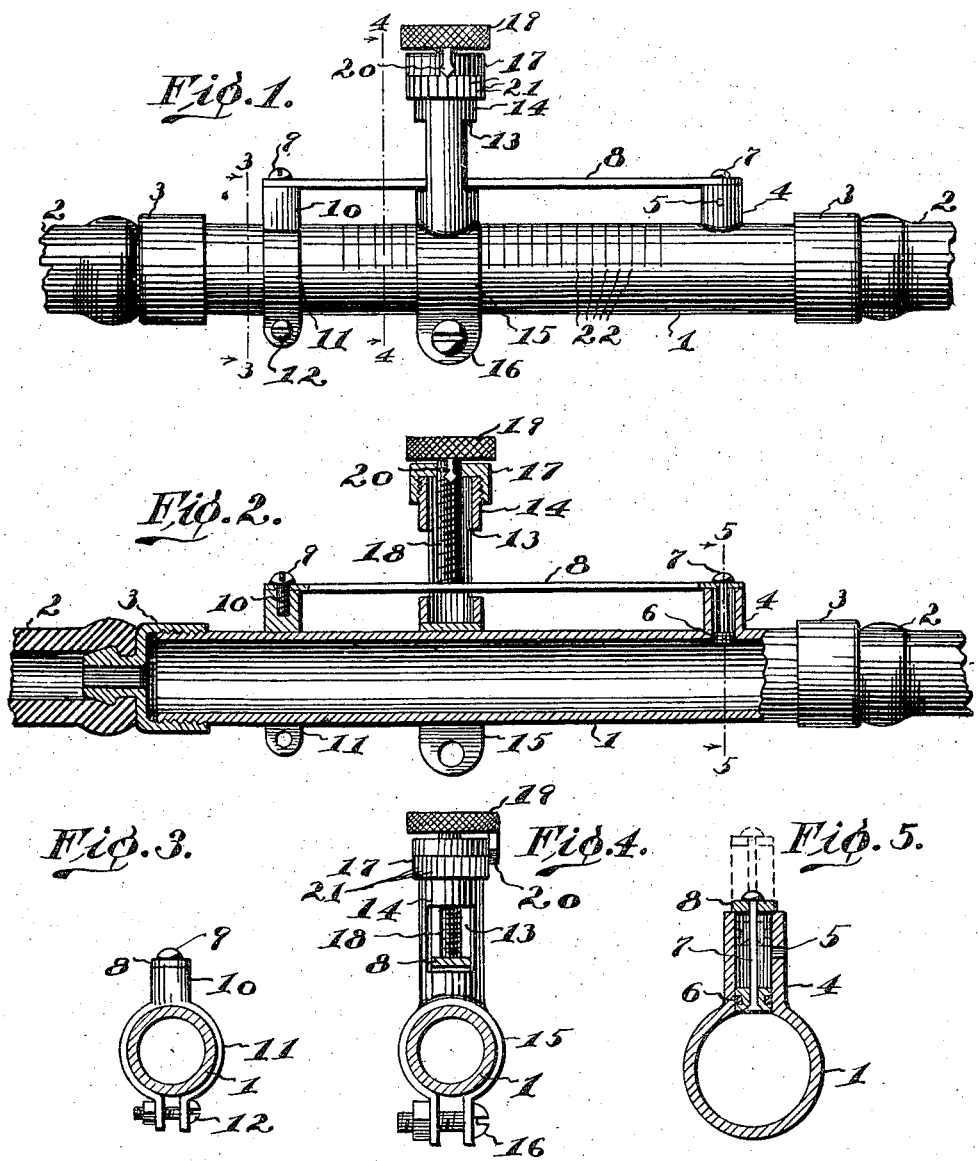

EDWARD W. PHILLIPS, OF DELTA, OHIO.

SAFETY TIRE-TESTER.

1,323,909.  Specification of Letters Patent.  Patented Dec. 2, 1919.

Application filed May 15, 1919. Serial No. 297,303.

*To all whom it may concern:*

Be it known that I, EDWARD W. PHILLIPS, a citizen of the United States, residing at Delta, in the county of Fulton, State of Ohio, have invented a new and useful Safety Tire-Tester; and I do hereby declare the following to be a full, clear, and exact description of the invention, such as will enable others skilled in the art to which it appertains to make and use the same.

The present invention relates to a blow-off valve for tire inflation tubes, and has for its object to provide a device of this character which embodies novel features of construction whereby the valve will automatically open and relieve the pressure when a predetermined pressure has been built up within the tire, thereby preventing over inflation of the tire and signaling to the operator when the proper degree of inflation has been reached.

Further objects of the invention are to provide a device of this character which is comparatively simple and inexpensive in its construction, which can be readily adjusted to blow out at different pressures, and which will enable the air pressure to be quickly and accurately built up within a tire without the necessity of detaching the inflation tube or pipe from the tire valve and applying a separate pressure gage thereto at intervals of time.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a blow-off valve construction which embodies the invention.

Fig. 2 is a longitudinal sectional view through the same.

Fig. 3 is a transverse sectional view on the line 3—3 of Fig. 1.

Fig. 4 is a similar view on the line 4—4 of Fig. 1.

Fig. 5 is a similar view on the line 5—5 of Fig. 2, the valve being shown by full lines in a closed position, and by dotted lines in an open position.

Corresponding and like parts are referred to in the following description and indicated in all the views of the drawings by the same reference characters.

Specifically describing the present embodiment of the invention, the numeral 1 designates a pipe section which is interposed in the length of the tire inflation tube 2. Suitable coupling members 3 are shown as applied to the ends of the pipe section 1 for the purpose of connecting the flexible tubes 2 thereto. A tubular arm 4 projects laterally from the pipe section 1 at a point toward one end thereof, said tubular arm being formed with a blow-off opening 5 in one side thereof. A piston or plunger 6 is slidable within the tubular arm 4, and is operatively connected as by means of a stem or pin 7 to a leaf spring 8. This spring extends longitudinally along the outside of the pipe section 1 in a spaced and substantially parallel relation thereto, the opposite end of the spring being rigidly secured by a suitable fastening member 9 to a block 10 which is clamped in position upon the pipe section. In the present instance the block 10 is shown as carried by a split clamping ring 11 of which the free ends are connected by a bolt 12. The tension of the leaf spring 8 normally moves the plunger 6 downwardly in the tubular arm 4 and thereby cuts off communication between the interior of the pipe section and the blow-off opening 5. However, when the pressure within the pipe section becomes sufficient to move the plunger 6 outwardly against the action of the leaf spring 8 to a point beyond the blow-off opening 5, as indicated by dotted lines on Fig. 5, the pressure within the pipe section will be relieved. Adjustment is made so that the plunger 6 is moved outwardly a sufficient amount to uncover the blow-off opening 5 when the proper pressure has been built up within the pneumatic tire, thereby avoiding over inflation of the tire, and avoiding the necessity of repeatedly uncoupling the inflation tube from the tire valve and applying a separate gage thereto for the purpose of ascertaining the pressure within the tire.

The leaf spring 8 extends through a lateral opening 13 in a tubular bracket 14 which is carried by a slide 15, said slide being adjustable longitudinally upon the pipe section 1, and being provided with a clamping bolt 16, by means of which it can be held rigidly in an adjusted position. A cap 17 is detachably fitted upon the upper end of the tubular bracket 14, and an adjusting screw 18 is threaded in this cap. The lower end of the adjusting screw is adapted to bear against the leaf spring 8, while the upper end thereof is provided with a head or finger piece 19. It will be obvious that this screw 18 can be manipulated to vary the distance the plunger 6 must travel outwardly against the spring pressure to uncover the port 5, thereby enabling adjustment to be made for causing the port to be opened at different pressures. The head 19 of the screw is shown as provided with a pointer 20 which coöperates with graduations 21 to indicate the pressure which will be built up within the pneumatic tire before the blow-off valve is brought into operation to relieve the pressure. It will be obvious that the effect of the adjusting screw 18 upon the action of the leaf spring 8 will depend to a considerable extent upon the point at which the leaf spring is engaged by the adjusting screw. The slide 15 is movable upon the pipe section so that adjustment can be made for this purpose, and the said pipe section is shown as provided with graduations 22 which enable the slide to be set with accuracy at any desired position.

Having thus described the invention, what I claim as new and desire to secure by Letters Patent, is:—

1. A blow-off valve for tire inflation tubes, including a pipe section formed with a tubular arm projecting laterally therefrom, a plunger slidable in the tubular arm, a leaf spring extending along the exterior of the pipe section and having one end thereof connected to the plunger, a block applied to the pipe section and having the other end of the leaf spring secured thereto, an adjusting screw mounted for engagement with an intermediate portion of the leaf spring, and supporting means for the adjusting screw.

2. A blow-off valve for tire inflation tubes, including a pipe section formed with a tubular arm projecting laterally therefrom, a plunger slidable in the tubular arm, a leaf spring extending along the exterior of the pipe section and having the plunger connected to one end thereof, means for securing the other end of the leaf spring to the pipe section, a slide mounted upon the pipe section, a bracket carried by the slide, and an adjusting screw carried by the bracket and adapted to engage an intermediate portion of the leaf spring, the movements of the slide enabling the screw to be adjusted to engage the spring at different points in the length thereof.

3. A blow-off valve for tire inflation tubes, including a pipe section formed with a tubular arm projecting laterally therefrom, a plunger slidable in the tubular arm, a leaf spring extending along the exterior of the pipe section and having the plunger connected to one end thereof, a block projecting from the pipe section and having the other end of the leaf spring secured thereto, a tubular bracket projecting from the pipe section and formed with a lateral opening through which the leaf spring extends, a cap applied to the outer end of the tubular bracket, an adjusting screw threaded in the cap and adapted to engage the leaf spring, and indicating means associated with the adjusting screw.

4. A blow-off valve for tire inflation tubes, including a pipe section formed with a tubular arm projecting laterally therefrom and provided with graduations, a plunger slidable in the tubular arm, a leaf spring extending along the exterior of the pipe section and having the plunger connected to one end thereof, a block applied to the pipe section and having the other end of the leaf spring connected thereto, a slide mounted upon the pipe section and accurately adjustable thereon by means of the before mentioned graduations, a bracket arm projecting from the slide, an adjusting screw carried by the bracket arm and adapted to engage the leaf spring, and indicating means associated with the adjusting screw for enabling an accurate adjustment to be obtained.

In testimony whereof I have signed my name to this specification in the presence of two subscribing witnesses.

EDWARD W. PHILLIPS.

Witnesses:
A. T. McComb,
W. E. Fowler.